United States Patent [19]

Adams et al.

[11] 4,290,783

[45] Sep. 22, 1981

[54] PROCESS FOR REMOVAL OF WATER SOLUBLE PARTICULATE MATERIAL FROM GAS STREAMS

[75] Inventors: Harry A. Adams, Bedford Heights; William O. Fitzgibbons, Hudson, both of Ohio

[73] Assignee: Standard Oil Company (Sohio)

[21] Appl. No.: 622,181

[22] Filed: Oct. 10, 1975

[51] Int. Cl.³ .............................................. B01D 47/06
[52] U.S. Cl. ......................................... 55/89; 55/94; 55/233
[58] Field of Search ....................... 55/70, 89, 94, 233, 55/525, DIG. 16

[56] References Cited

U.S. PATENT DOCUMENTS

| | | | |
|---|---|---|---|
| 3,237,381 | 3/1966 | Hvostoff et al. | 55/89 |
| 3,307,332 | 3/1967 | Grace et al. | 55/DIG. 16 |
| 3,387,889 | 6/1968 | Ziemba | 55/233 X |
| 3,396,515 | 8/1968 | Wright | 55/DIG. 16 |
| 3,763,633 | 10/1973 | Soltis | 55/525 X |
| 3,772,858 | 11/1973 | Klugman | 55/233 X |
| 3,861,889 | 1/1975 | Takae et al. | 55/233 X |

FOREIGN PATENT DOCUMENTS 2161222 7/1972 Fed. Rep. of Germany ........ 55/233

OTHER PUBLICATIONS

"New Polymers–Filter Cloths of the Future, Part 1", an article in Filtration and Separation, Mar./Apr., 1970, pp. 160-163, 166 and 167.

Primary Examiner—David L. Lacey
Attorney, Agent, or Firm—David J. Untener; Herbert D. Knudsen; Larry W. Evans

[57] ABSTRACT

The present invention relates to a new and improved process for the removal of urea entrained in air streams by passing the particulate-laden air through a mist eliminator or a demister, the surface of which is continuously contacted with multiple water sprays to wash the water soluble contaminants from the surface of the demister.

12 Claims, 1 Drawing Figure

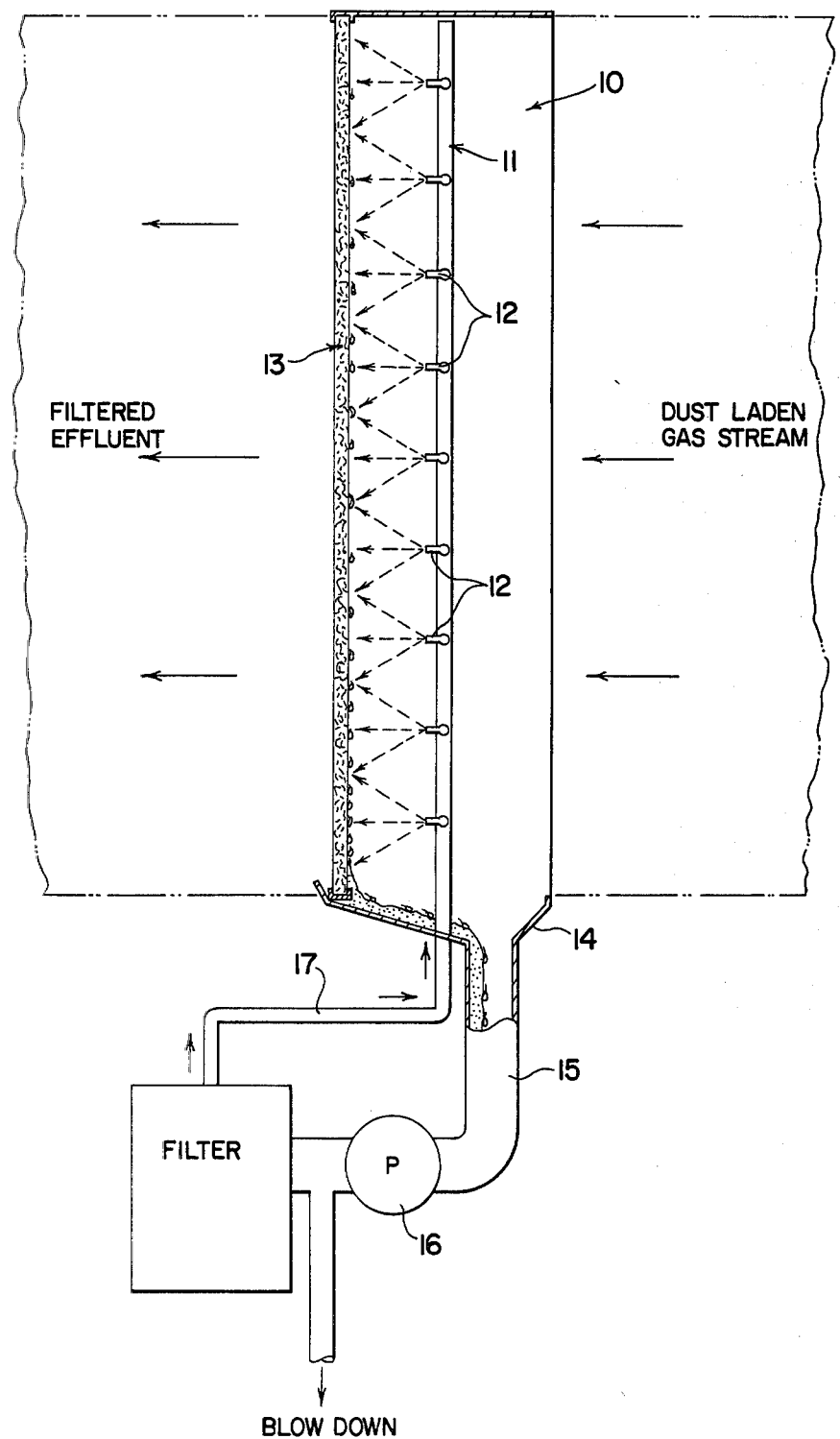

PROCESS FOR REMOVAL OF WATER SOLUBLE PARTICULATE MATERIAL FROM GAS STREAMS

BACKGROUND OF THE INVENTION

To comply with clean air standards set by the environmental protection agencies, it has become necessary to control the emission of foreign dust particles to the atmosphere from various industrial operations to within certain acceptable limits. The present invention is directed toward meeting these standards. Although various processes and means have been reported for the removal of foreign entrained solid particles from gas streams, none of the methods reported pertain to the removal of water soluble particulate matter from a gas stream by the method described in the present invention.

The German Pat. No. 2,161,222 issued July 6, 1972 (T. Takae, T. Kawabe, and S. Maeno) describes a process for dust separation from a gas by passing the dust-containing gas through a filter composed of a porous foam wherein the porous foam is impregnated with a solvent for the dust.

THE INVENTION

The present invention comprises a method for the removal of water soluble, particulate matter, such as urea, entrained in an air stream by first contacting the particle-laden gas stream with a continuous water spray partially wetting the urea particles, then passing the gas stream containing the partially wetted particles through a mist eliminator or a demister as it is sometimes referred to, with sufficient velocity to cause impaction of some of the urea particles on the surface thereof, whereupon the impacted particles are then removed from the mist eliminator by means of a continuous water spray directed toward its incoming surface. The process also provides for the optional treatment of the return water from the mist eliminator for the recovery of the water-soluble contaminants therein, and for the recirculation of the return water to the water spray system.

This process has the important advantage over processes of the prior art of low pressure drop across the mist eliminator, thereby enabling efficient treatment of large volumes of gases. Additionally, this process has the further advantage of requiring less water for the removal of contaminants from gas streams than is required in conventional scrubbing operations where countercurrent water flow is utilized. For example, water volumes in the range of about one gallon/1000 CFM of particulate-laden gas treated have been found to be satisfactory in the present process.

The mist eliminator employed in the present process comprises a three-dimensional net work of chemically resistant knitted wires or synthetic fibers which is generally designed to separate liquid entrainment in vapor streams. One of the distinguishing features of this type of filter media is that the packing comprises a random distribution of interconnecting irregular-shaped void spaces of different sizes between the fibers which form tortuous vapor paths throughout the fiber bed. Additionally the void space between the fibers of a demister may comprise from 60 to 98% of the total volume of the demister. This type of filter is readily distinguishable from conventional filters which are characterized by more closely packed fibers which form capillary-type pathways throughout the filter bed.

In its usual application, as the gas containing entrained particles passes through the mist eliminator, the liquid particles are impacted and collected on the fibers in the bed and coalesce into liquid droplets which are moved in a horizontal direction through the fiber bed and downward by gravity. In the present process which pertains to solid particulate matter in gas streams, the mist eliminator functions in a somewhat different manner wherein the partially wetted, slushy particles entrained in the gas stream coalesce and readily adhere to the incoming surface of the demister by wet impaction. These adhering particles are then easily removed from the surface by dissolving in the continuous water spray.

The process of the present invention although applicable in general to the removal and recovery of water soluble particles entrained in gas streams, this process is particularly applicable to urea plants for the removal and recovery of urea dust entrained in air streams eminating from urea prilling towers. The invention will be more fully understood from the following description taken in conjunction with the accompanying drawing, wherein the single figure diagrammatically illustrates the embodiment of the present invention.

DESCRIPTION OF THE DRAWING

Referring to the drawing, substantial amounts of solid particulate matter entrained in a gaseous fluid are removed therefrom by causing the contaminated gas stream to enter a suitable enlargement or a housing 10 which contains a vertical riser 11 which in turn is provided at spaced intervals with spray nozzles 12 positioned sufficiently close together so that the composite water spray from all of the nozzles will form a uniform spray pattern across the entire surface of the demister pad 13. While only a single vertical bank of spray nozzles is shown in the figure, the use of multiple banks of nozzles is also contemplated to be within the scope of the present invention. Also contemplated to be within the scope of this invention is the optional use of spray nozzles of the atomizing type. Water is pumped through water feed line 17 and into the vertical riser 11 to which the spray nozzles 12 are affixed by means of pump 16 positioned in the return water drain line 15. Provisions are made for the gravitational accumulation of the water returning from the demister 13 into a collection trough 14 situated at the bottom of the housing. The contaminated water is continuously removed from the trough via drainline 15 and, if desired, may be treated at this point to remove the contaminants therefrom before it is recirculated to the water feed system through line 17.

As the particle-laden gas stream moving at a certain minimum velocity enters the housing 10, the stream is contacted with the water spray from the bank of nozzles 12 and the wetted particles formed impact and readily adhere to the demister pad 13, while the gas containing a substantially reduced concentration of particulate matter passes through the demister. The particles adhering to the demister are then washed from its surface by the water spray directed against the surface of the demister, and the particles are carried off in solution to the collection trough 14 provided at the bottom of the housing. Following the optional treatment to remove the contaminants from the drain water, the water is recirculated by means of pump 16 to the water feed system.

In the process directed to the removal of urea dust from air streams, it is advantageous to incorporate low concentrations of urea in the wash water spray directed against the surface of the demister to minimize crystal formation and caking of urea particles on its surface. This can be conveniently accomplished by adjusting the concentration of urea in the recirculating drain water from the demister and in the fresh water make-up so that a concentration of from about 1 to 15 percent by weight of urea may be maintained in the wash water spray. More preferably, the concentration of urea in the wash water spray is maintained in the range of from 1 to 5 percent by weight.

DESCRIPTION OF THE PREFERRED EMBODIMENTS

The composition of the fibers comprising the mist eliminator 13 employed in this process may vary widely, and practically any material that can be wire drawn can be utilized. Suitable materials include metals such as stainless steel, Monel, Inconel, aluminum, Hastelloy B, and the like, or they may include synthetic materials, such as Teflon, polyester, fiberglass, polyvinyl chloride, polyurethane, polyethylene, polypropylene and the like. Most preferably, the porous member is composed of expanded aluminum, polyethylene or polypropylene. It is also desirable to employ a porous member having a considerable amount of open area so the pressure differential across the mist eliminator is in the range of about 0.3 to 0.6 inches of water. Mist eliminators having 85 to 98 percent by volume of open area have been found to be especially satisfactory.

For satisfactory operation it is essential that the wetted urea particles strike the surface of the demister with sufficient energy to cause wet impaction of the particulate matter on its surface. Accordingly, an air stream carrying entrained particles must travel at a certain minimum velocity in order for impaction of the particles to occur. For urea particles entrained in air, this minimum linear velocity of the air stream is in the range of three feet per second.

The particle size range of the urea which can be effectively removed by this process is in the range where at least 50 percent of the particles have diameters of less than three microns.

The effectiveness of the present invention for the removal of foreign particles from a particle-laden gas stream is illustrated by the following examples wherein urea dust was effectively removed from the cooling air exhaust exiting from the windows of a urea prilling tower.

The process of the present invention was evaluated by the ASME test procedure, Power Test Code-27, which was approved by the Ohio Environmental Protection Agency.

SPECIFIC EMBODIMENT

Experiments representing the invention were conducted on a demister pad test module installed in one of the 10 exhaust exit windows of the urea prilling tower. Window no. 2 of the prilling tower was fitted with a vertical filter consisting of polypropylene demister pads, (A.C.S. Industries) having a thickness of 3 inches with a one-inch foam demister backing (Scott Industries), and an open are a volume of 95%. This demister was representative of the mist eliminators of the present invention. The windows without the test module were tested for comparative purposes and are referred to as uncontrolled effluent.

Air sampling filters were desiccated and weighed before use. After sampling and desiccating overnight, the filters were reweighed and the dust loadings were calculated. The air volume sampled was measured with a dry test meter and the volume of the air exiting the prill tower was determined from heat balance calculations. A probe was used with the sampling rate being varied to obtain an isokinetic sample.

The total emissions were calculated by multiplying the total air flow up the tower by the average weight gain of urea on the sample filters per unit volume of air.

Calculations based on the readings indicated the air velocity at the demister pad test module face was 5.0 ft/second. Spray water circulation was 0.5 gpm/1000 CFM of air, and the spray water contained 2 percent by weight of urea in solution and was directed against the entire surface of the demister pad. Pressure drop measured across the demister test module was 0.5 inches of water.

The emission rates determined for the exit windows with and without the mist eliminator under the above process conditions are compared in Table I. The acceptable dust emission as established by the Ohio Environmental Protection Agency was obtained using Ohio EPA regulation AP-3-12. The process weight was determined by adding the air rate to the urea prill rate, and the allowable emission rate was then determined by applying the process weight to the Tables in regulation AP-3-12. The allowable emission rates are also shown in Table 1 for comparative purposes.

TABLE 1

| | Urea Emissions In Prill Tower Tests | | | | | |
| --- | --- | --- | --- | --- | --- | --- |
| | Process Conditions | | | Emission Rates - lbs./day | | |
| Test | Prill Rate Ton/day | Air Rate SCFM | Process Rate Ton/hr. | Uncontrolled (No Demister Pad) | Controlled (With Demister Pad) | Allowable |
| 1 | 853 | 249,400 | 599 | 2428 | 1270 | 1728 |
| 2 | 714 | 280,700 | 664 | 3098 | 1700 | 1754 |

We claim:
1. A process for the removal of urea particles entrained in an air stream by (1) contacting the particle-laden air stream with a continuous water spray partially wetting the urea particles, (2) passing the air stream containing partially wetted urea particles through a mist eliminator consisting of fiber compositions having an open area volume greater than 60 percent based on the total volume of the mist eliminator with sufficient velocity to cause impaction of some of the urea particles on the surface thereof, and (3) continuously removing the impacted urea particles from the surface of the mist eliminator by means of the continuous water spray directed towards its incoming surface.

2. The process in claim 1 wherein the water spray directed to the incoming surface of the mist eliminator contains urea in concentrations ranging from 1 to 15 percent by weight.

3. The process in claim 2 wherein the return water draining from the mist eliminator is recirculated to the water spray system of the process.

4. The process in claim 3 wherein the urea-laden air stream strikes the surface of the mist eliminator at a minimum linear velocity of three feet/second.

5. The process in claim 4 wherein the mist eliminator consists of fiber compositions selected from the group consisting of polyethylene, polypropylene, and expanded aluminum.

6. The process in claim 5 wherein the fiber composition consists of expanded aluminum.

7. The process in claim 5 wherein the fiber composition consists of polypropylene.

8. The process in claim 5 wherein the mist eliminator has an open area volume in the range of from 85 to 98 percent based on the total volume of the mist eliminator.

9. Process for removing particulate material from a dust-laden gas exhausting from the top of a prilling tower, which comprises passing the dust laden gas through an aqueous scrubbing liquid spray and thence through a filter while simultaneously directing the scrubbing liquid spray against the filter in the same direction as the flow of gas for maintaining the filter in a continuously wetted and irrigated state, and passing cleaned gas from the downstream side of the filter out of the top of the tower.

10. Process according to claim 9 wherein the dust has at least one water soluble constituent and the scrubbing liquid is chosen from water or an aqueous solution of said constituent of the dust.

11. Process according to claim 10 wherein the scrubbing liquid is recycled.

12. Process according to claim 11 wherein at least some of the recycled scrubbing liquid is treated to recover the solutes therefrom.

* * * * *